United States Patent [19]
Jan

[11] Patent Number: 5,426,960
[45] Date of Patent: Jun. 27, 1995

[54] AUTOMOBILE STEERING LOCK

[76] Inventor: Shwu-Meei Jan, No.7-2, Alley 13, Lane 54, Sec. 2, Hsing-Nan Road, Jung-Heh, Taipei Hsien, Taiwan

[21] Appl. No.: 179,645

[22] Filed: Jan. 7, 1994

Related U.S. Application Data

[63] Continuation-in-part of Ser. No. 52,611, Apr. 27, 1993, abandoned.

[51] Int. Cl.⁶ ............................................. B60R 25/02
[52] U.S. Cl. ........................................ 70/209; 70/226
[58] Field of Search ............... 70/209, 211, 212, 225, 70/226, 237, 238

[56] References Cited

U.S. PATENT DOCUMENTS

| | | | |
|---|---|---|---|
| 5,031,429 | 7/1991 | Wang | 70/209 |
| 5,033,281 | 7/1991 | Kofman et al. | 70/209 |
| 5,097,685 | 3/1992 | Lien | 70/211 |
| 5,138,853 | 8/1992 | Chen | 70/209 |
| 5,144,822 | 9/1992 | Jan et al. | 70/209 |
| 5,199,283 | 4/1993 | Chen | 70/209 |
| 5,199,284 | 4/1993 | Lin | 70/209 |
| 5,253,497 | 10/1993 | Hsieh | 70/238 |
| 5,257,518 | 11/1993 | Hsieh | 70/209 |

*Primary Examiner*—Peter M. Cuomo
*Assistant Examiner*—Darnell M. Boucher
*Attorney, Agent, or Firm*—Pro-Techtor International

[57] ABSTRACT

An antitheft device for mounting on a steering wheel of an automobile either diametrically across the rim or the steering wheel or extending radially outwardly towards the windshield of the automobile from an engagement with the rim and having an extended portion adapted to block complete rotation of the steering wheel. The device has a locking capability which simplifies and reduces the amount of manual manipulation required to mount and remove the steering wheel lock. A locking mechanism is provided to engage and lock the rim of the steering wheel and a hook extends radially with respect to the rim either diametrically for an engagement with the rim or outwardly towards the windshield of the automobile.

6 Claims, 9 Drawing Sheets

AUTOMOBILE STEERING LOCK

This is a continuation-in-part application of my U.S. Patent application Ser. No. 08/052,611, filing date Apr. 27, 1993 now abandoned.

BACKGROUND OF THE INVENTION

Figure 1:
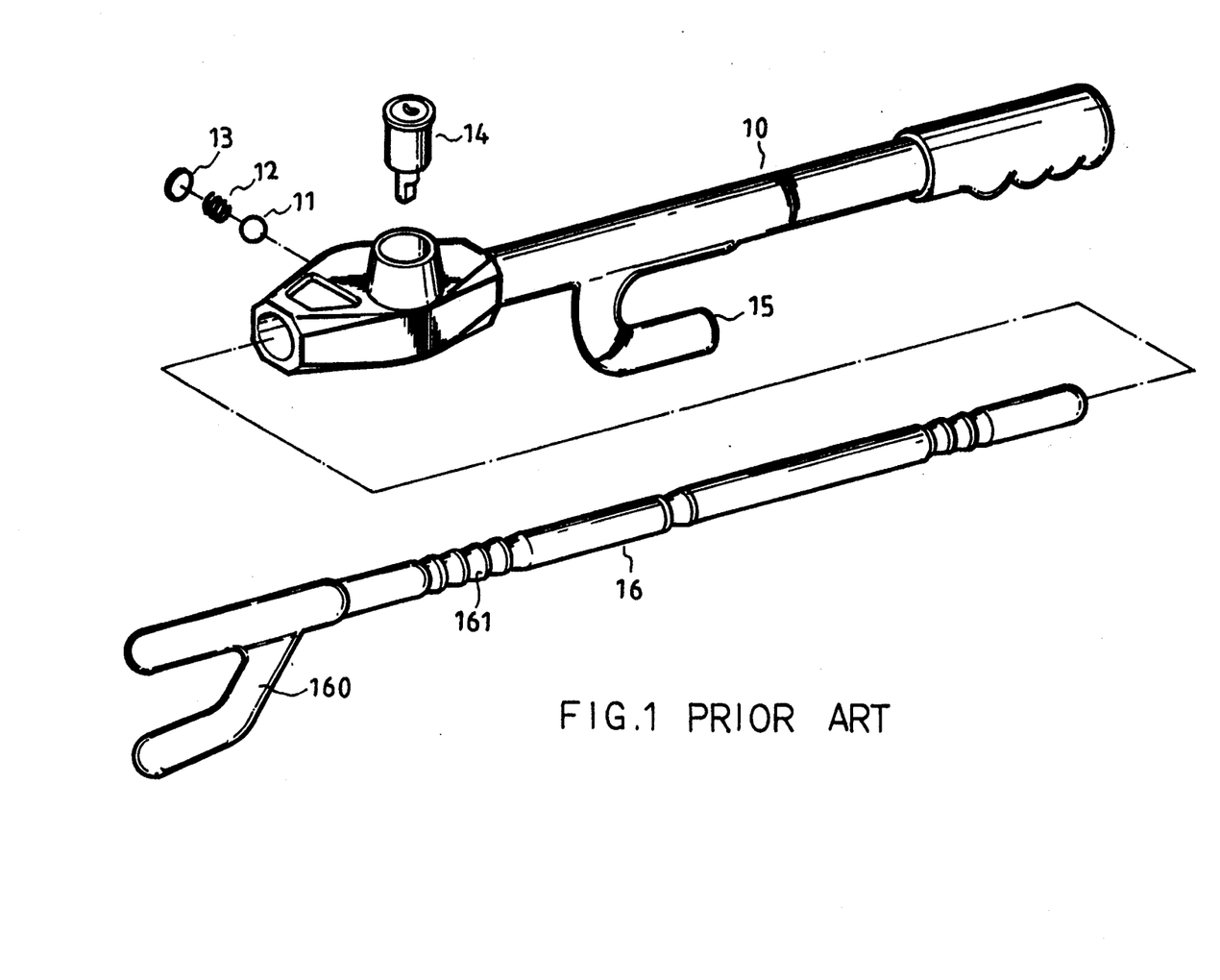
FIG. 1 is a perspective and exploded view illustrating a known antomobile steering lock.
Figure 2:
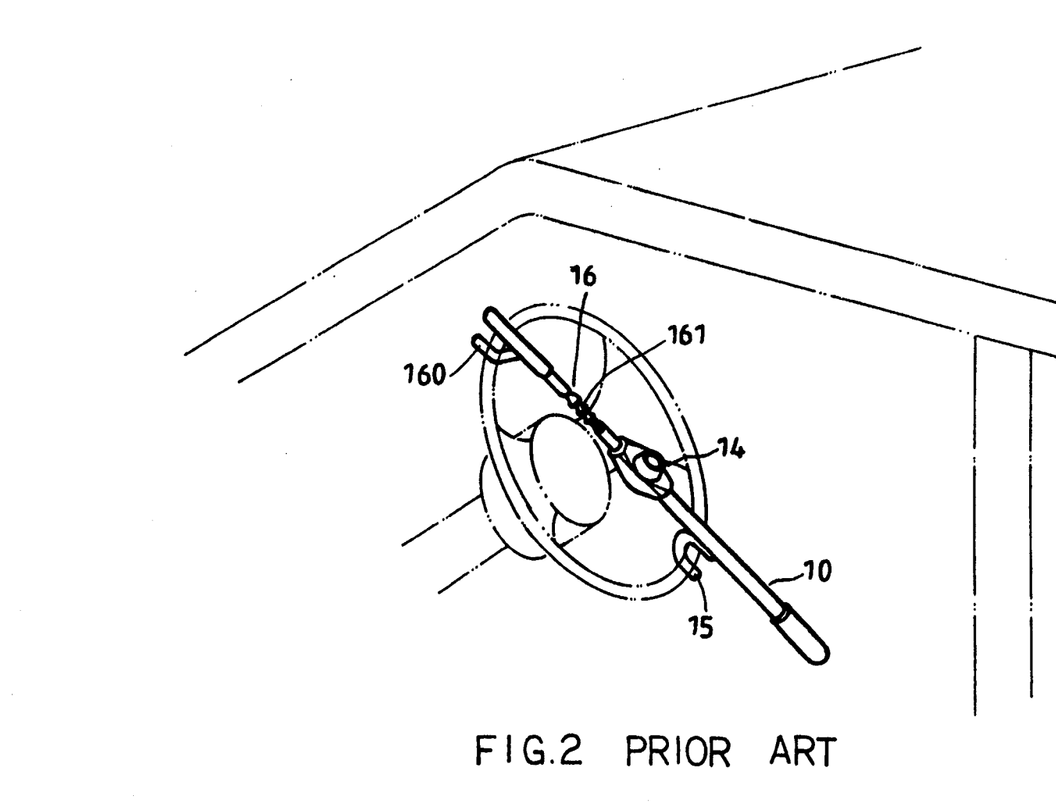
FIG. 2 is a perspective view of the known steering lock, shown in a position taken when mounted on a steering wheel.

A conventional anti-theft device for attachment to a steering wheel of an antomobile, as shown in FIGS. 1 and 2, comprises an elongate tubular member 10, a locking unit including a steel ball 11, a spring 12 and a cap 13 and a lock 14 contained in a housing formed at one end of the tubular member 10, and an elongate rod member 16 having a hook 160 and a plurality of annular grooves 161 in a major portion of the rod member 16. The elongate member 16 is combined with the tubular member 10, extending in a passage way in the tubular member 10 for attaching opposed hooks 15, 160 onto opposite portions of a steering wheel of the automobile that prevents the steering wheel from rotation. It is found that hooks 15, 160 are liable to be forcefully bent outward with tools and removed from the steering wheel to make the automobile available to an unauthorized driving. In addition, the body of the device is too long, and inconvenient for handling and storing.

Various automobile steering locks have also been disclosed in the prior art U.S. Pat. No. 5,199,283 to Chen discloses a steering lock similar to the one shown in FIGS. 1 and 2 with two hooks secured in parallel to its rod member U.S. Pat. No. 5,199,284 to Lin discloses a lock device comprising mainly of a retaining plate unit, a blocking rod and a key plug unit. The retaining plate includes an elongate plate body covering two diametrically opposed portions of a steering wheel, a fixed pawl member fixed on the plate body, and a movable pawl member mounted axially movably on the plate body. The blocking rod is mounted axially movably on the plate body. The key plug unit has a locking mechanism locking the blocking rod releasably in one of some pre-selected positions at the retaining plate units so as to extend a portion of the blocking rod from an end of the retaining plate unit. These two lock devices are also too long in size and inconvenient for handling and storing.

U.S. Pat. No. 5,097,685 to Lien discloses a steering lock comprising a lock case with a cylinder being able to lock two snap catches receiving two opposed portions of a steering wheel, a stop plate assembly having a L-shaped base plate secured to said lock case at a back through a face joint and an extension plate vertically extending from the base plate at one end and disposed to stop against a car instrument dash board, and a stop plate with one end fastened in the lock case and an opposite stopped against a car front door window. This steering lock is complicated in structure and inconvenient in handling and storing.

OBJECTS OF THE INVENTION

It is accordingly a primary object of the present invention to provide an automobile steering lock that overcomes the foregoing defects associated with the prior art.

It is another object of the present invention to provide a locking device with a structure enhancing compact in size and easy in operation.

It is a further object of the present invention to provide an automobile steering lock capable for mounting on a steering wheel at different positions.

DETAILED DESCRIPTION OF A PREFERRED EMBODIMENT

Figure 3:
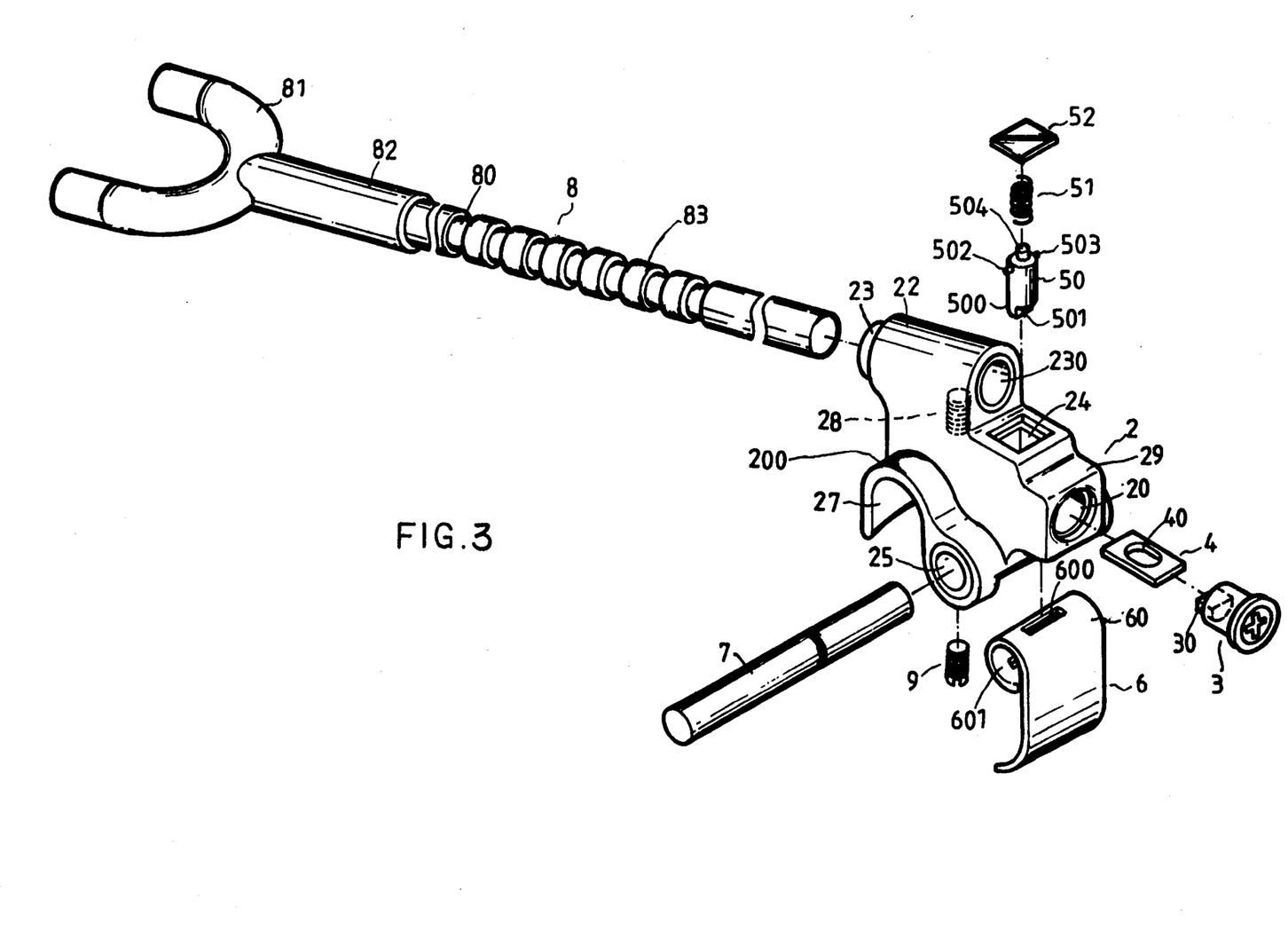
FIG. 3 is a perspective and exploded view illustrating a preferred embodiment according to the invention.
Figure 4:
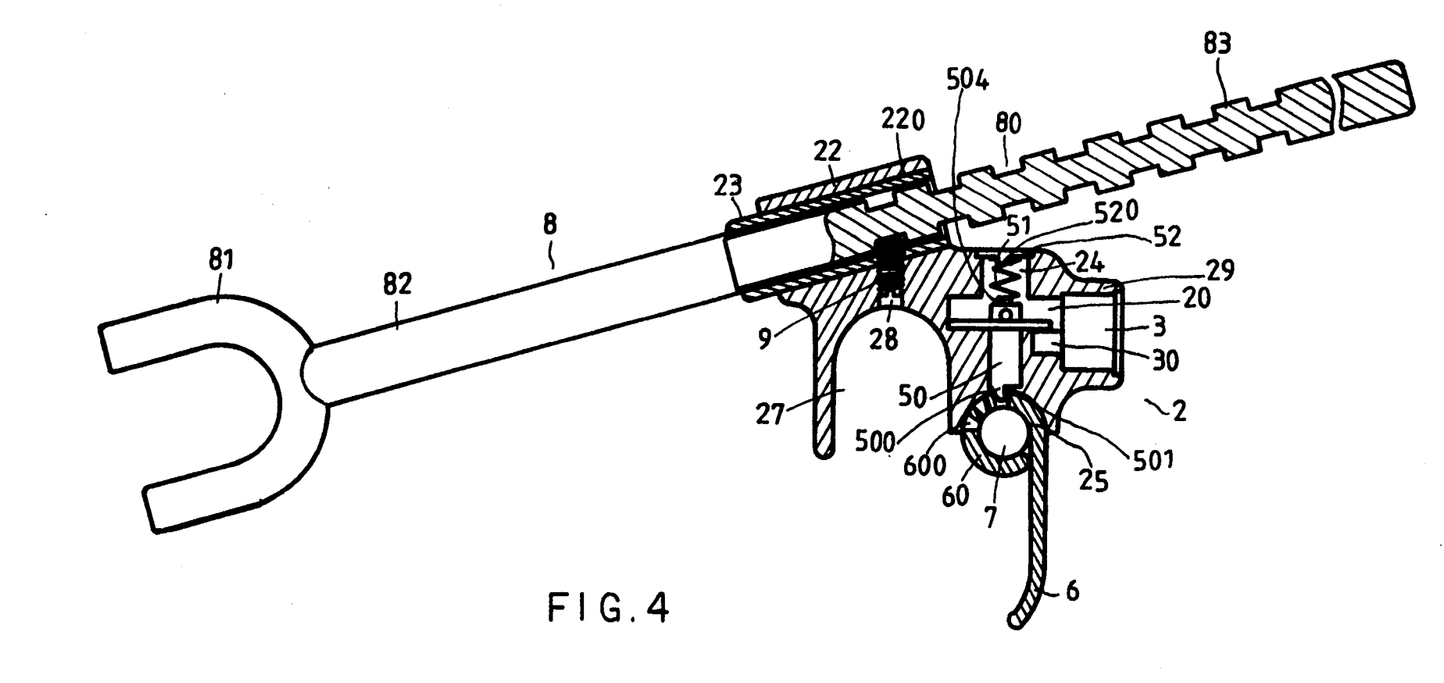
FIG. 4 is a side elevational and partially cross-sectional view of the invention which is in assembled condition.

Referring now to FIGS. 3 and 4, an automobile steering lock according to the invention which comprises mainly an elongated rod member 8, a body member 2 and a lock mechanism.

The elongated rod member 8 includes an axial rod of circular cross-section, which is divided into a first or front portion 83 and a second or rear portion 82 with a diameter larger than diameter of the front portion 83. A plurality of annular grooves 80 axially spaced are circumferentially provided along a major portion of the front portion 83. A U-shaped hook 81 is fixedly secured to a rear end of the second portion 82.

The body member 2 includes a tubular member 22 on top to form a cylindrical inner space 220 for fittingly receiving a sleeve 23 which defines an inclined passage 230 extending axially therethrough. Outer diameter of the front portion 83 of the elongated rod member 8 is dimensioned slightly less than the diameter of the inclined passage 230 in the sleeve 23 to enable front portion 83 of the elongated rod member 8 to telescope freely in the tubular member 22. The tubular member 22 includes means to position and lock the elongated rod member 8 at any one of a plurality of axially spaced positions that will be discussed later.

The body member 2 further includes a lock housing 29 integrally formed at a front or outer end thereof and having a bore 20 therethrough into the housing 29 for receiving a retainer 4 which is a plate formed with a central opening 40 and firmly receiving a conventional key lock 3. A conventional actuator 30 is attached to an inner end of the key lock 3. Said actuator 30 has an arcuate outer surface and a flat or recess portion. A vertical passage 24 interconnects the bore 20 and extends downwardly across the bore 20 for accommodating a locating member 50 and a coil spring 51.

Said locating member 50 is generally cylindrical in shape and has a tenon, which consists of a vertical side wall 501 and a convex or slope side wall 500, shaped on the bottom end, a pair of opposed pins 502, 503 projecting radially outwardly and a projection 504 integrally formed on top. A metal lid member 52 is provided to be restored in the entrance of the vertical passage 24 by means of a press fit after assembly.

A pair of bracket members 200 are attached to opposite side walls of the body member 2 to form two lateral wings and define a transverse tunnel passage 27, extending along a transverse direction substantially perpendicular to the axial direction, at bottom of the body member 2 with an opening facing downwardly for receiving a portion of rim of a steering wheel and terminated at one end thereof with eyes 25 in alignment along the transverse direction with each other.

An inner-threaded screw passage 28 interconnecting the inclined passage 230 and transverse tunnel passage 27 is provided for receiving a screw 9 threaded from tunnel passage side towards inclined passage side with an end protruding from the screw passage 28 into the inclined passage 230 to engage an annular groove 80 of the elongated rod member 8 thus to position and lock the same at any of a plurality of axially spaced positions, as best shown in FIGS. 4, 5, 7 and 8.

A lip member 6 is provided for closing the bottom opening of the transverse tunnel passage 27 with one end 60 terminated with an eye 601 and adapted to be located between spaced eye ends of the bracket member 200 with three eyes 25, 601 in alignment along the transverse direction to define a passage for receiving a pivot 7. Spaced eyes 25 of the bracket member 200 are dimensioned to firmly receive the pivot 7 and the eye 601 of the lip member 6 is dimensioned to allow a swing or rotatable movement about the pivot 7. A series of slots 600 are evenly spaced along circumferential wall of the eye end 60 of the lip member 6.

Figure 5:
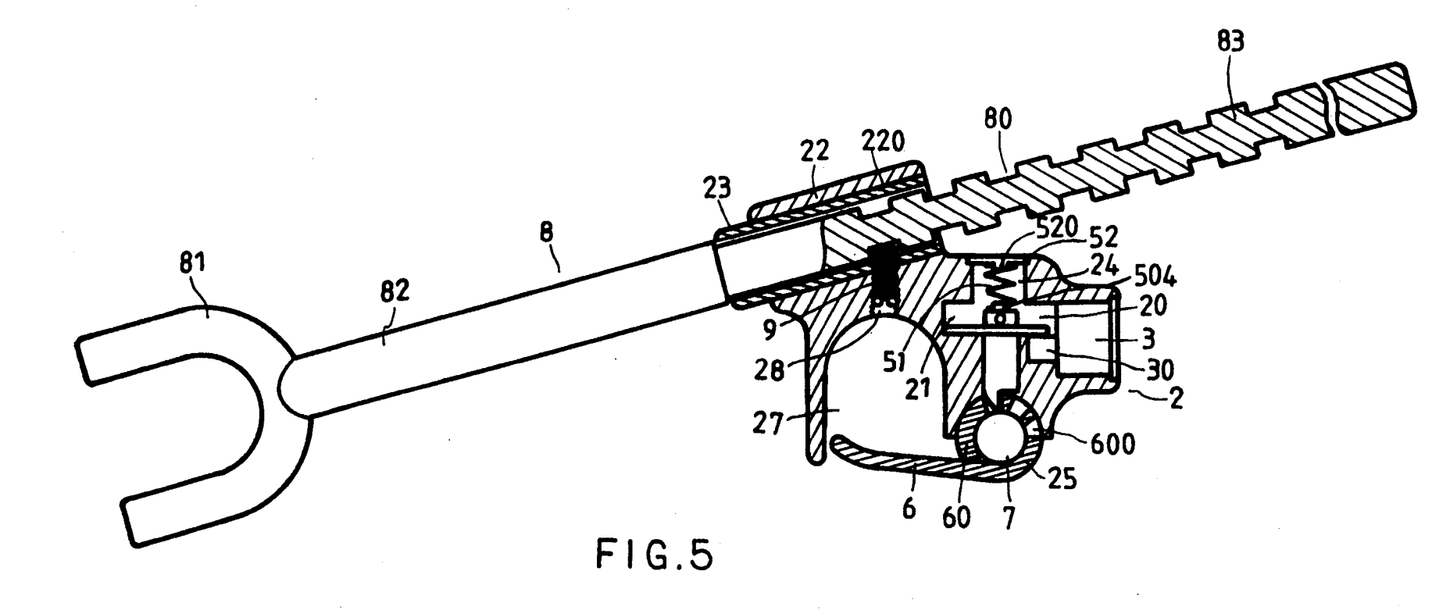
FIG. 5 is a side elevational and partially cross-sectional view of the invention which is in locked condition.
Figure 9:
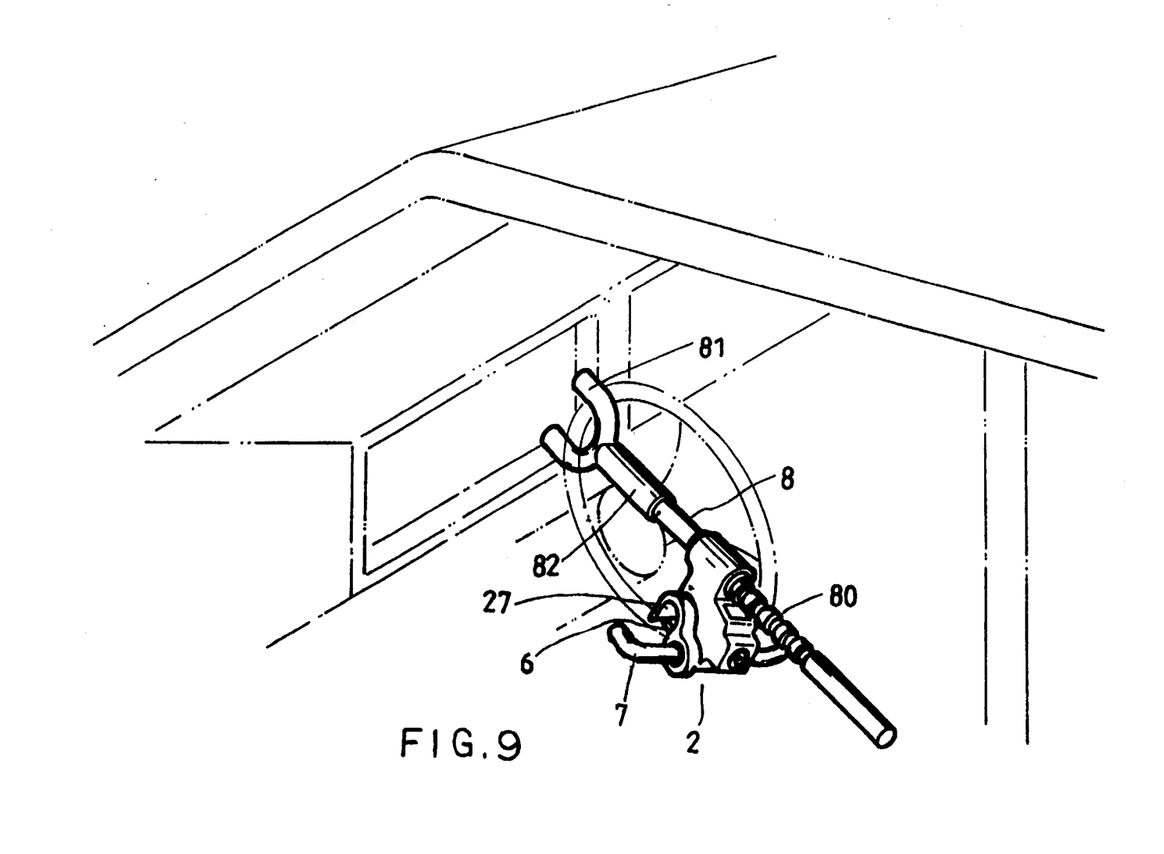
FIG. 9 is a perspective view of the invention shown in an alternate position taken when mounted on a steering wheel.

In assembly, as shown in FIGS. 4 and 5, the retainer 4 is disposed into the bore 20 with its central opening 40 vertically in alignment with the vertical passage 24 and the key lock 3 is fitted in the bore 20 with the actuator 30 disposed under the retainer 4 and the flat or recess portion of the actuator 30 normally close to or abutting against bottom of the retainer 4. The locating member 50 extends through central opening 40 of the retainer 4 with pins 502, 503 resting on the retainer 4 thus to be supported and retained thereby. The coil spring 51 is compressed between the locating member 50 and lid member 52 with two ends thereof receiving projections 504, 520 on the locating and lid members 50, 52 to keep the coil spring 51 in position and bias the locating member 50 towards the eye end 60 of the lip member 6 so that the tenon on bottom end of the locating member 50 is able to be engaged in one of the series of slots 600 in the eye end 60 of the lip member 6. After assembly, two ends of the pivot 7 are bent, as shown in FIGS. 6 and 9, for abutting against rim of steering wheel when the invention is mounted thereon.

Operation of the automobile steering lock is illustrated in FIGS. 4 through 9. As shown in FIG. 4, the coil spring 51 normally biases the locating member 50 downwardly of the vertical passage 24 and into engagement between the vertical side wall 501 of the tenon end and a stop wall of the slot 600 in the eye end 60 of the lip member 6. The lip member 6 is thereby constrained from a counterclockwise rotation about the pivot 7. Clockwise rotating movement of the lip member 6 about the pivot 7, as shown in FIG. 5, causes another side wall in the slot 600 to act against the convex or slope side wall 500 of the tenon end of the locating member 50 whereby the locating member 50 is moved upwardly of the vertical passage 24 against the force of the coil spring 51 and out of engagement with the slot 600. The coil spring 51 then returns the locating member 50 back downwardly into engagement with slot 600 in a next position to permit further clockwise rotating movement of the lip member 6 without a manual key operation until a locked position where the lip member 6 closes the open bottom of the tunnel passage 27.

Figure 7:
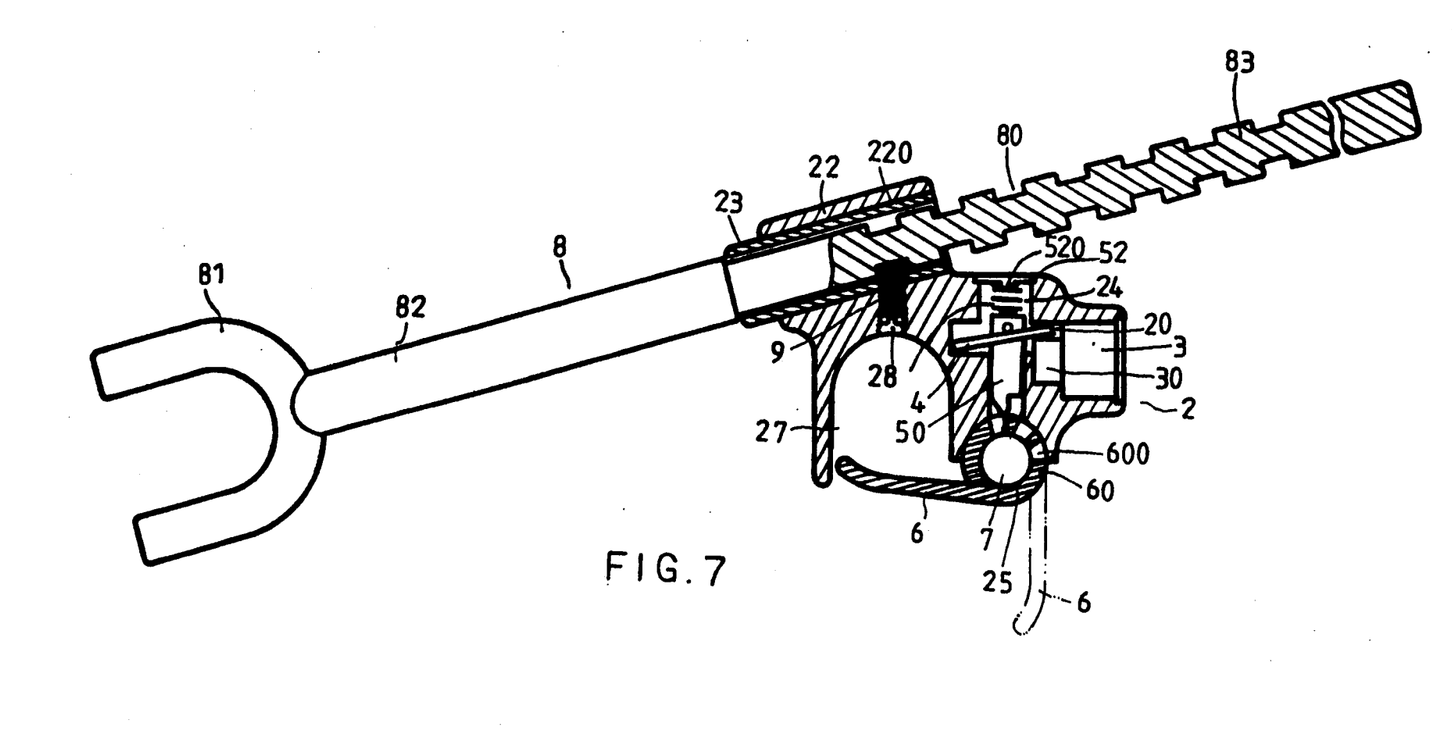
FIG. 7 is a side elevational and partially cross-sectional view of the invention which is in unlocked condition.
Figure 8:
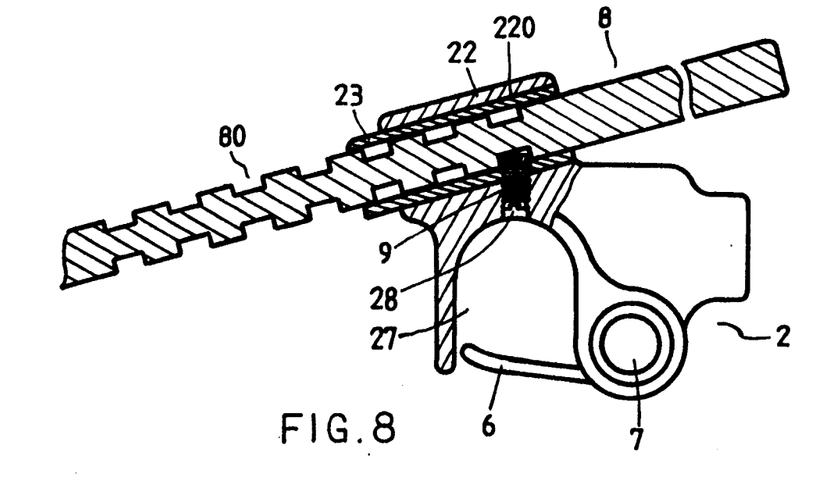
FIG. 8 is a side elevational and partially cross-sectional view of the invention with an elongate rod member partially cut off.

As shown in FIG. 7, use of the key lock 3 to rotate the actuator 30 causes the actuator 30 to act against bottom surface of the retainer 4 whereby the locating member 50 is withdrawn upwardly of the vertical passage 24 and out of engagement with the corresponding slot 600 to freely permit counterclockwise rotating movement about the pivot 7 of the lip member 6.

Figure 6:
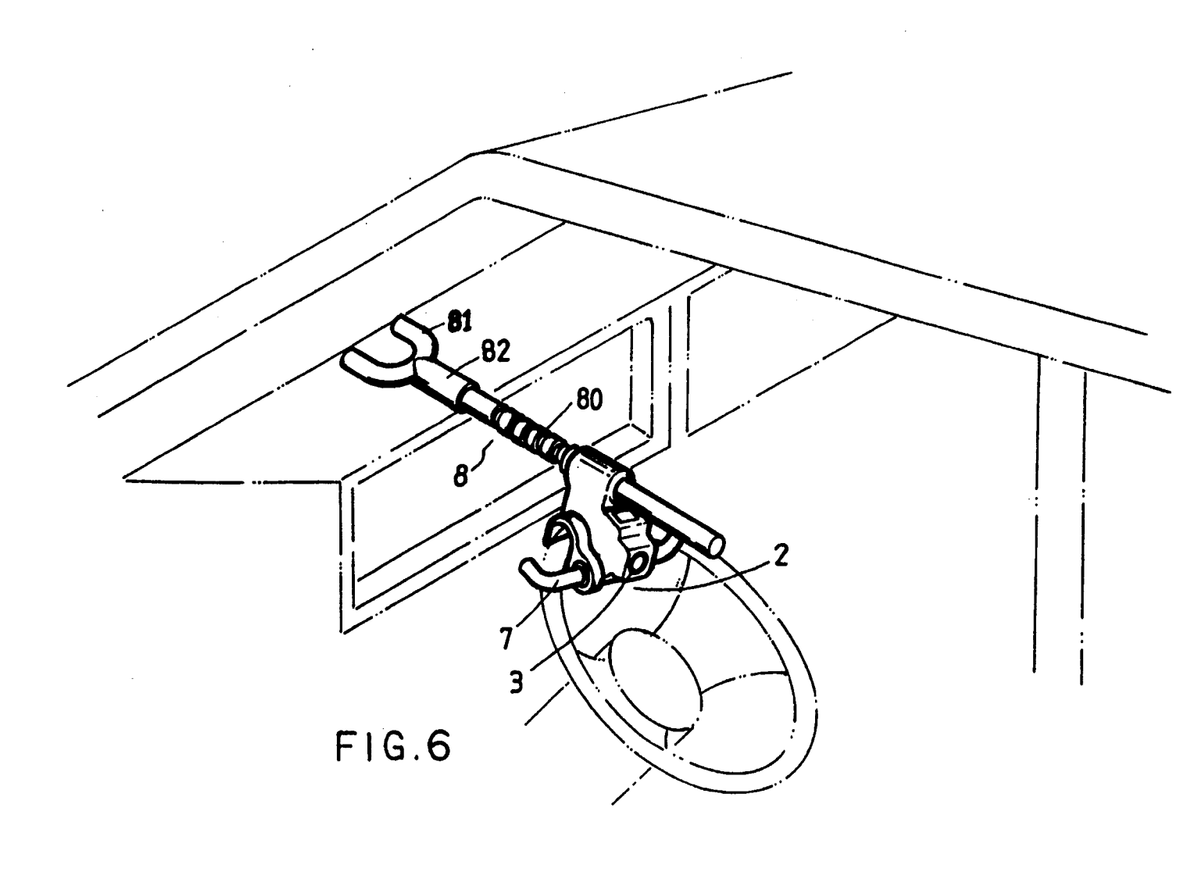
FIG. 6 is a perspective view of the invention in a position taken when mounted on a steering wheel.

As shown in FIG. 6, the steering wheel lock is mounted on a steering wheel by placing the body member 2 on a portion remote from the driver of a steering wheel of a car to catch the rim with tunnel groove 27 shaped under the body member 2 and then by swinging the lip member 6 into its locked position to firmly seize the steering wheel. The steering wheel is thus locked with the elongated rod member 8 extending frontwardly towards windshield of the car on or above dashboard thereof. Keyhole of the key lock 3 opens in a direction facing the driver for easy access. Moreover, the steering wheel lock extends from a remote end of the steering wheel towards windshield so as totally not to interfere with or contact the wheel spokes or the horn carried on the wheel.

Alternatively, as shown in FIG. 9, the steering wheel lock can be mounted on a steering wheel in a way similar to known steering wheel locks by first placing the hook 81 of the elongated rod member 8 over the steering wheel rim and then engaging a portion of the steering wheel diametrically opposed to the hook 81 by placing the body member 2 thereon to catch the rim with tunnel groove 27 thereunder and swing the lip member 6 into its locked position.

What is claimed is:

1. An antitheft device for attachment to a steering wheel of an automobile comprising:
   a body member having a first end defining a first passageway extending therethrough and a second end opposed to the first end;
   an enclosure having a first half located on the second end of the body member and shaped into a groove mating rim periphery of the steering wheel and extending substantially perpendicular to an axis of the first passageway and a second half rotatable between a locked position to enclose in association with the first half the rim periphery of the steering wheel and an unlocked position to release the enclosure allowing removal of the body member from the steering wheel;
   a rod member having an elongated rod adapted to extend in a telescopic manner within the first passageway in the body member and a U-shaped hook secured to one end of the rod for engaging the steering wheel from the inside thereof;
   a screw means disposed in the body member to position and lock the rod member at any of a plurality of axially spaced positions;

a pivot interconnecting one end of the first and second halves of the enclosure enabling a rotating movement about the pivot of the second half; and a lock means disposed within the body member at a third side thereof and having a lock and a lock mechanism to permit a retraction of the second half of the enclosure from its locked position into unlocked position;

wherein said rod member extends from the steering wheel in a plane not parallel to that of the steering wheel, such that said rod member may be wedged into a corner formed by windshield and a dashboard, and the screw means includes an inner-threaded second passageway interconnecting the first passageway in the first side of the body member and the first half of the enclosure on the second end of the body member, a plurality of annular grooves axially spaced along a portion of the elongated rod of the rod member and a screw threaded from the first half of the enclosure into the second passageway for an engagement with any one of the annular grooves in the rod member.

2. An antitheft device as claimed in claim 1 wherein the first half of the enclosure is a bracket member with an end terminated with a pair of spaced eyes, the second half of the enclosure has an eye end which has a substantially cylindrical outer side wall and defines an eye and is disposed between the spaced eyes of the first half to define thereamong a passageway for receiving the pivot.

3. An antitheft device as claimed in claim 2 wherein eyes of the first half are dimensioned for firmly receiving the pivot.

4. An antitheft device as claimed in claim 2 wherein the eye in the eye end of the second half of the enclosure is dimensioned to allow a rotating movement of the second half about the pivot.

5. An antitheft device for attachment to a steering wheel of an automobile comprising:

a body member having a first end defining a first passageway extending therethrough and a second end opposed to the first end;

an enclosure having a first half located on the second end of the body member and shaped into a groove mating rim periphery of the steering wheel and extending substantially perpendicular to an axis of the first passageway and a second half rotatable between a locked position to enclose in association with the first half the rim periphery of the steering wheel and an unlocked position to release the enclosure allowing removal of the body member from the steering wheel;

a rod member having an elongated rod adapted to extend in a telescopic manner within the first passageway in the body member and a U-shaped hook secured to one end of the rod for engaging the steering wheel from the inside thereof;

a screw means disposed in the body member to position and lock the rod member at any of a plurality of axially spaced positions;

a pivot interconnecting one end of the first and second halves of the enclosure enabling a rotating movement about the pivot of the second half; and a lock means disposed within the body member at a third side thereof and having a lock and lock mechanism to permit a retraction of the second half of the enclosure from its locked position into unlocked position;

wherein said rod member extends from the steering wheel in a plane not parallel to that of the steering wheel, such that said rod member may be wedged into a corner formed by a windshield and a dashboard, and the first half of the enclosure is a bracket with an end terminated with a pair of spaced eyes, the second half of the enclosure has an eye end which has a substantially cylindrical outer side wall and defines an eye and is disposed between the spaced eyes of the first half to define thereamong a passageway for receiving the pivot, and two ends of the pivot are bent after fitting into eyes of the first and second halves of the enclosure for abutting against the rim of the steering wheel when mounting the antitheft device thereon.

6. An antitheft device as claimed in claim 1 wherein the third side of the body member is formed with a third passageway and a fourth passageway which extends perpendicular to and across the third passageway towards the eye end of the second half of the enclosure, said lock mechanism includes a plate member formed with an opening and disposed within the third passageway, a plurality of slots evenly spaced along circumference of the eye end of the second half, a locating or pawl member disposed within the fourth passageway, extending through the opening of the plate member with a pair of pins extending outwardly for resting on the plate member to retain the locating member in position where a tenon attached to a leading end of the locating member engages one of the slots, a spring disposed within the fourth passageway and biasing the locating member towards the eye end of the second half, said conventional lock is disposed in the third passageway to block entrance thereof and actuated with a key to lever the plate member for disabling the spring to permit disengagement of the tenon from the slot to permit retraction of the second half of the enclosure from its locked position into unlocked position.

* * * * *